US008756303B2

(12) United States Patent
Hwang et al.

(10) Patent No.: US 8,756,303 B2
(45) Date of Patent: Jun. 17, 2014

(54) METHOD AND APPARATUS FOR DETERMINING OBJECT UPDATES IN A HOME NETWORK

(75) Inventors: Tae-Hwan Hwang, Gyeonggi-do (KR); Ki-Chul Park, Gyeonggi-do (KR); Byung-Soo Lim, Gyeonggi-do (KR); Chan-Seok Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 150 days.

(21) Appl. No.: 13/160,005

(22) Filed: Jun. 14, 2011

(65) Prior Publication Data

US 2011/0307595 A1 Dec. 15, 2011

(30) Foreign Application Priority Data

Jun. 14, 2010 (KR) ........................ 10-2010-0055823

(51) Int. Cl.
*G06F 15/16* (2006.01)
*G06F 15/173* (2006.01)

(52) U.S. Cl.
USPC ............ 709/223; 709/203; 709/219; 709/248

(58) Field of Classification Search
USPC ....................................................... 709/223
See application file for complete search history.

(56) References Cited

U.S. PATENT DOCUMENTS

| | | | | |
|---|---|---|---|---|
| 6,639,687 | B1 * | 10/2003 | Neilsen | 358/1.14 |
| 6,996,771 | B1 * | 2/2006 | O'Brien | 715/207 |
| 7,065,559 | B1 * | 6/2006 | Weiss | 709/219 |
| 7,305,678 | B2 * | 12/2007 | Perks et al. | 719/311 |
| 7,571,167 | B1 * | 8/2009 | Campana et al. | 1/1 |
| 7,786,705 | B2 * | 8/2010 | Janik et al. | 320/158 |
| 7,844,738 | B2 * | 11/2010 | Eytchison | 709/246 |
| 7,937,469 | B2 * | 5/2011 | Hamada et al. | 709/225 |
| 7,979,392 | B2 * | 7/2011 | Oh et al. | 707/621 |
| 7,997,494 | B2 * | 8/2011 | Duncan | 235/472.01 |
| 8,074,290 | B2 * | 12/2011 | Nakano et al. | 726/33 |
| 8,150,916 | B2 * | 4/2012 | Togashi et al. | 709/204 |
| 8,185,949 | B2 * | 5/2012 | Jonsson | 726/18 |
| 8,194,681 | B2 * | 6/2012 | Kaarela et al. | 370/401 |
| 8,205,235 | B2 * | 6/2012 | Hlasny et al. | 725/80 |

(Continued)

FOREIGN PATENT DOCUMENTS

EP    1710961 A2 * 10/2006
JP    2007158854 A * 6/2007

(Continued)

OTHER PUBLICATIONS

Thubert, P. et al. "Network Mobility Home Network Models," RFC 4887, Jul. 2007.*

(Continued)

*Primary Examiner* — Melvin H Pollack
(74) *Attorney, Agent, or Firm* — The Farrell Law Firm, P.C.

(57) ABSTRACT

A method and apparatus for determining an object update in a home network. In a method for determining an object change in a home network, a media controller receives an object update identifier (objectUpdateID) and an initial update identifier (initUpdateID) for an object from an accessed media server, compares the objectUpdateID and the initUpdateID with a system update identifier (systemUpdateID) that was previously stored in the media controller, when the media controller previously accessed the media server, and determines whether the object is updated according to the comparison result.

20 Claims, 10 Drawing Sheets

(56) References Cited

U.S. PATENT DOCUMENTS

| | | | |
|---|---|---|---|
| 8,260,828 B2* | 9/2012 | Dijk et al. | 707/812 |
| 8,291,037 B2* | 10/2012 | Kumar | 709/217 |
| 8,307,093 B2* | 11/2012 | Klemets et al. | 709/227 |
| 8,359,351 B2* | 1/2013 | Istvan et al. | 709/203 |
| 8,359,591 B2* | 1/2013 | de Vries et al. | 717/172 |
| 8,375,143 B2* | 2/2013 | Zhang et al. | 709/246 |
| 8,458,288 B2* | 6/2013 | Ahn et al. | 709/217 |
| 8,463,964 B2* | 6/2013 | Kostadinov et al. | 710/104 |
| 8,504,712 B2* | 8/2013 | Lee | 709/231 |
| 8,515,938 B2* | 8/2013 | Kusakabe et al. | 707/708 |
| 8,601,189 B2* | 12/2013 | Song et al. | 710/105 |
| 8,612,387 B2* | 12/2013 | Schwartz et al. | 707/620 |
| 8,635,272 B2* | 1/2014 | Reisman | 709/203 |
| 2005/0204065 A1* | 9/2005 | Son et al. | 709/248 |
| 2006/0041596 A1* | 2/2006 | Stirbu et al. | 707/200 |
| 2007/0078959 A1* | 4/2007 | Ye | 709/223 |
| 2007/0156899 A1 | 7/2007 | Yoon et al. | |
| 2007/0226312 A1* | 9/2007 | Stirbu et al. | 709/217 |
| 2007/0280145 A1 | 12/2007 | Ahn et al. | |
| 2008/0120338 A1 | 5/2008 | Constantin | |
| 2008/0208920 A1* | 8/2008 | Stirbu et al. | 707/201 |
| 2008/0301103 A1* | 12/2008 | Kusakabe et al. | 707/3 |
| 2009/0080453 A1* | 3/2009 | Stirbu | 370/433 |
| 2009/0164562 A1* | 6/2009 | Inagaki | 709/203 |
| 2009/0260042 A1* | 10/2009 | Chiang | 725/80 |
| 2010/0169505 A1* | 7/2010 | Noguchi et al. | 709/231 |
| 2010/0169514 A1* | 7/2010 | Noguchi et al. | 710/19 |
| 2011/0055218 A1* | 3/2011 | Capuozzo et al. | 707/741 |
| 2011/0119351 A1* | 5/2011 | Tamura | 709/217 |
| 2012/0079029 A1* | 3/2012 | Damola et al. | 709/204 |
| 2012/0096157 A1* | 4/2012 | Lee | 709/225 |

FOREIGN PATENT DOCUMENTS

| | | | |
|---|---|---|---|
| KR | 2005088699 A * | 9/2005 | |
| KR | 1020070082016 | 8/2007 | |
| KR | 2007091393 A * | 9/2007 | |
| KR | 1020080014690 | 2/2008 | |
| KR | 1020080050371 | 6/2008 | |
| WO | WO 2005079071 A1 * | 8/2005 | |
| WO | WO 2007136195 A1 * | 11/2007 | |

OTHER PUBLICATIONS

Melanchuk, T. "An Architectural Framework for Media Server Control," RFC 5567, Jun. 2009.*

Van Dyke, J. et al. "Media Server Control Markup Language (MSCML) and Protocol," RFC 5022, Sep. 2007.*

Tusch, Roland et al. "Context-Aware UPnP-AV Services for Adaptive Home Multimedia Systems," International Journal of Digital Multimedia Broadcasting, vol. 2008, Article ID 835438, 2008, 12 Pages.*

Belimpasakis, P. et al. "Home Media Atomizer: Remote Sharing of Home Content—Without Semi-Trusted Proxies," IEEE Transactions on Consumer Electronics, vol. 54, Issue 3, Aug. 2008, pp. 1114-1122.*

Matsubara, F. M. et al. "Managing a Media Server Content Directory in Absence of Reliable Metadata," IEEE Transactions on Consumer Electronics, vol. 55, Issue 2, May 2009, pp. 873-877.*

Wonseok Kwon, "Introduction to Universal Plug and Play Content Synchronization Service," IEEE International Symposium on Consumer Electronics, Apr. 16, 2008, pp. 1-4.*

Hyunyong Lee and JongWon Kim, "An Approach for Content Sharing among UPnP Devices in Different Home Networks," IEEE Transactions on Consumer Electronics, vol. 53, Issue 4, Nov. 2007, pp. 1419-1426.*

Yaonan Zhang and Brandsma, E. "Active Content Transcoding in Networked Environment," International Conference on Electronics and Information Engineering (ICEIE), vol. 1, Aug. 3, 2010, pp. V1-338-V1-341.*

* cited by examiner

METHOD AND APPARATUS FOR DETERMINING OBJECT UPDATES IN A HOME NETWORK

PRIORITY

This application claims priority under 35 U.S.C. §119(a) to a Korean patent application filed in the Korean Intellectual Property Office on Jun. 14, 2010 and assigned Serial No. 2010-0055823, the entire disclosure of which is hereby incorporated by reference.

BACKGROUND OF THE INVENTION

1. Field of the Invention

The present invention relates generally to a home network, and more particularly, to a method and apparatus for determining an object updates in a media service by using a Content Directory Service (CDS) of Universal Plug and Play (UPnP).

2. Description of the Related Art

UPnP is a protocol capable of discovering and controlling electric appliances connected to a network, and is a standard technique of home networking. In particular, UPnP Audio/Video (AV) is a technique for using multimedia content, such as AV, through the network based on the UPnP. Generally, a UPnP AV system includes a media server, a media renderer, and a controller for controlling the media server and the media renderer. The media server provides a multimedia file by using a CDS. The media renderer reproduces the multimedia file provided from the media server. The controller provides control such that the media server and the media renderer can operate through interoperations. Herein, CDS indicates a service included in the media server. CDS manages content on an object basis. Each object has several pieces of information, i.e., properties, for representing the object.

A plurality of media servers can be present in one home network. The plurality of media servers can have different content. Accordingly, there is a need for a method capable of easily synchronizing the media controller with the different media servers in order to receive content distributed in the different media servers from the perspective of a conventional UPnP AV user. In particular, when content is newly added or modified in a media server, there is a need for a method in which the media controller detects the addition or modification of the content and announces the detection result to the users. For example, there is a need for a method in which a tag "New" is set to a newly added object in the media server, a tag "Modified" is set to a modified object, and the tag "New" and the tag "Modified" are both set to a newly added and modified object so that the users can easily recognize the added or modified objects.

Accordingly, a $3^{rd}$ version of UPnP CDS provides a function by which the media controller can identify addition, deletion, and modification for objects of the media server. In this method, an object update identifier (objectUpdateID) is set for each object in the media server, and thereafter when an object change occurs, the objectUpdateID is updated so that the media controller can identify whether the object is added and modified.

Figure 1:
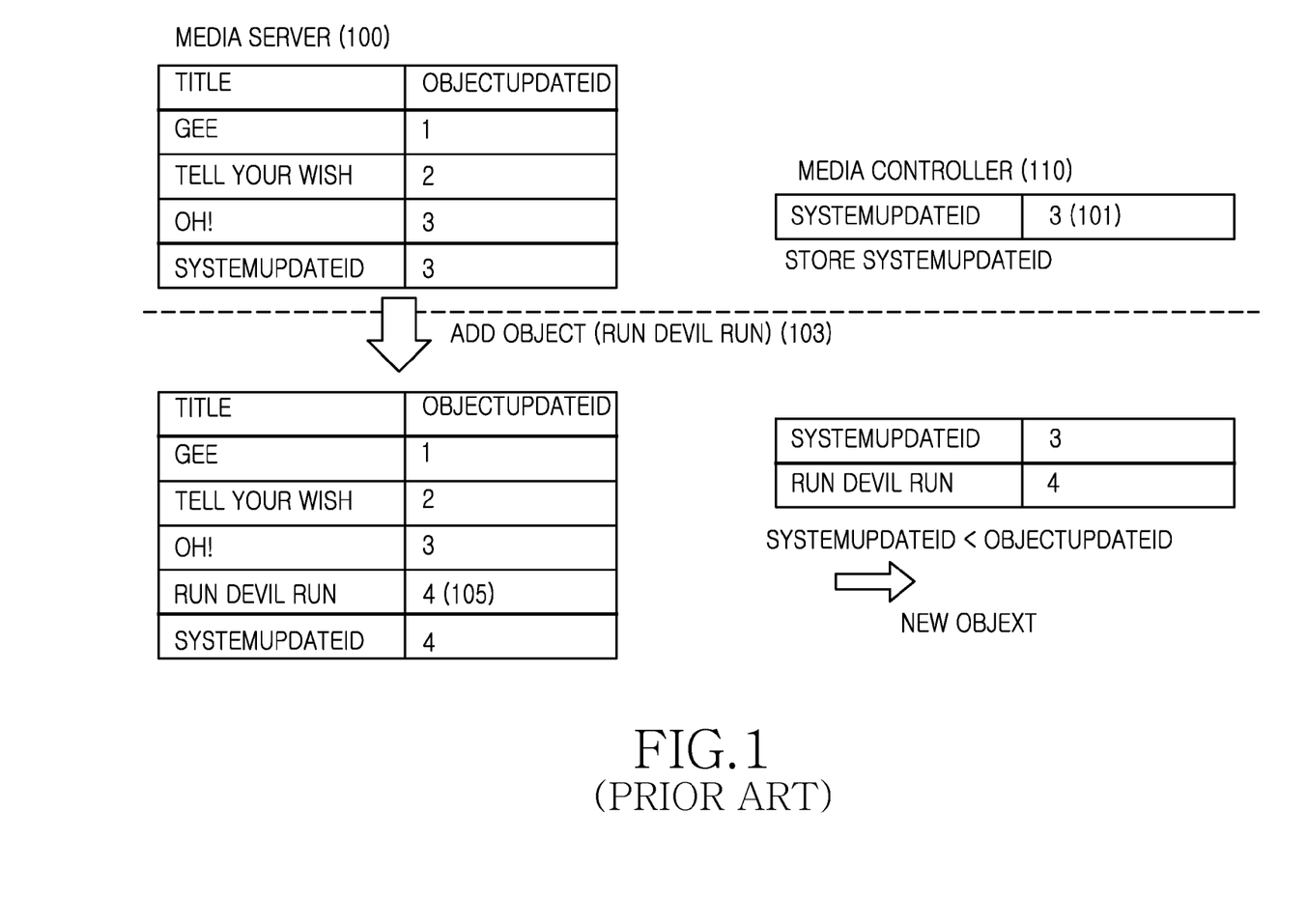
FIG. 1 illustrates a conventional method in which content is added using a CDS.

FIG. 1 illustrates a conventional method in which content is added using a CDS.

Referring to FIG. 1, a media server 100 stores three objects. In this case, an objectUpdateID is mapped to each object. The objectUpdateID is set to a value greater than that of a previous object according to an addition order. In this case, when a media controller 110 accesses the media server 100, the media controller 110 stores a maximum value (i.e., 3) of the objectUpdateIDs mapped to the respective objects as a system update identifier (systemUpdateID) 101. Thereafter, when a new object is added in the media server (as indicated by a reference numeral 103), the media server maps a value 4, which is greater than the objectUpdateID of the previous object to the added object, as an objectUpdateID 105. Accordingly, when the media controller 110 re-accesses the media server 100, the media controller 110 will identify the objectUpdateID 105 having a value greater than the systemUpdateID 101 stored previously, and can determine the object to be a newly added object.

As described above, the $3^{rd}$ version of UPnP CDS uses the objectUpdateID mapped to each object in order for the media controller to identify addition, deletion, and modification for each object of the media server. However, this method has a problem in that it only indicates if there is a change in the content, but does not identify if the change is an addition an object is added in the media server or if a previously stored object is modified.

Figure 2:
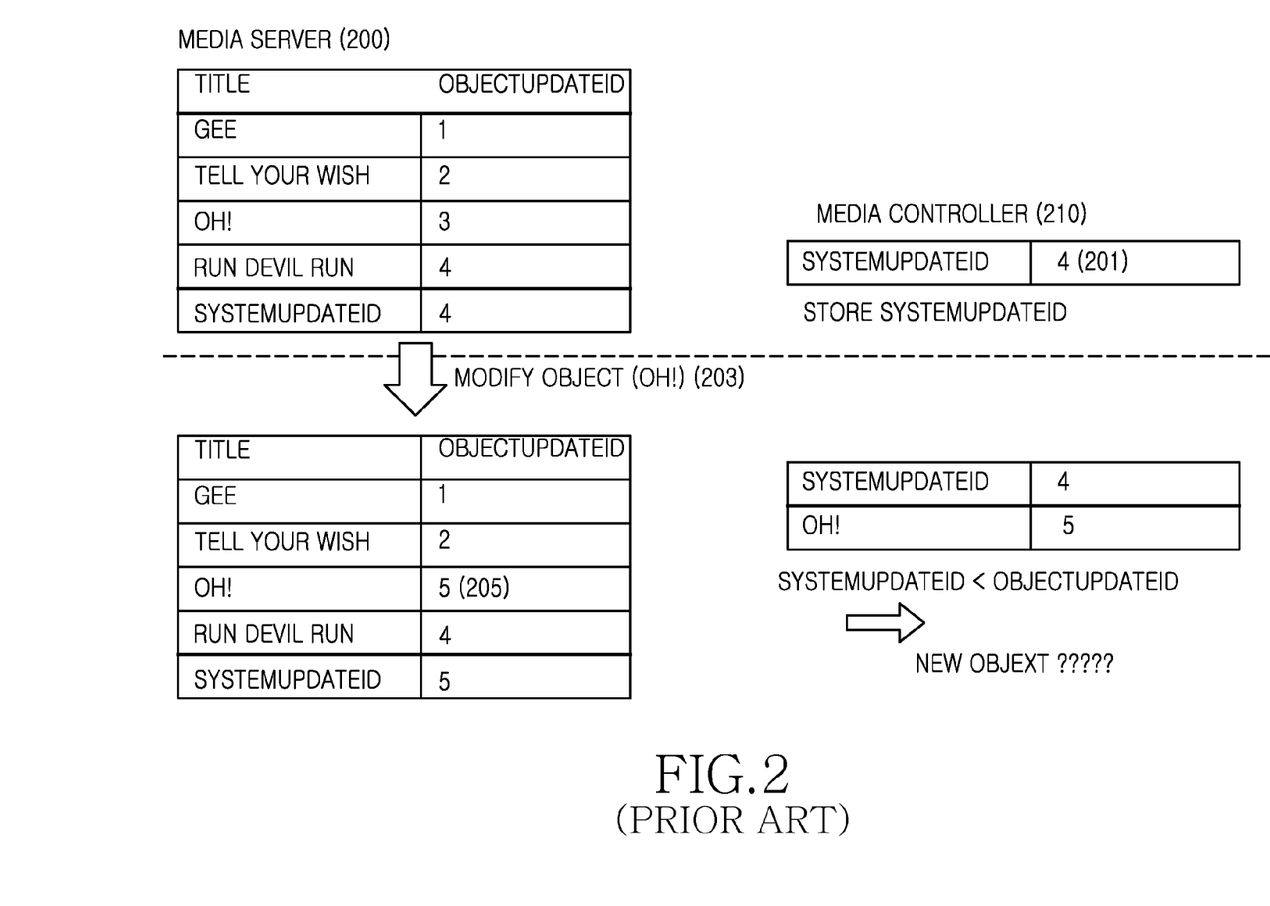
FIG. 2 illustrates a conventional method in which content is modified in a CDS.

FIG. 2 illustrates a conventional method in which content is modified using a CDS.

Referring to FIG. 2, a media server 200 stores four objects. In this case, when a media controller 210 accesses the media server 200, the media controller 210 stores a maximum value (i.e., 4) of the objectUpdateIDs mapped to the respective objects as a systemUpdateID 201. Thereafter, when an object is modified in the media server 200 (as indicated by a reference number 203), the media server 200 sets an objectUpdateID 205 of the modified object to a value 5 which is greater than the objectUpdateID of the previous object. When the media controller 210 re-accesses the media server 200, the media controller 210 will identify the objectUpdateID 205 having a value greater than the systemUpdateID 201 stored previously, and can determine that there is an updated object, i.e., modified or new. However, as described above, because this method is that same as that described in FIG. 1, there is a problem in that the media controller 210 cannot identify whether the updated object is a newly added objected or a modified object.

Figure 3:
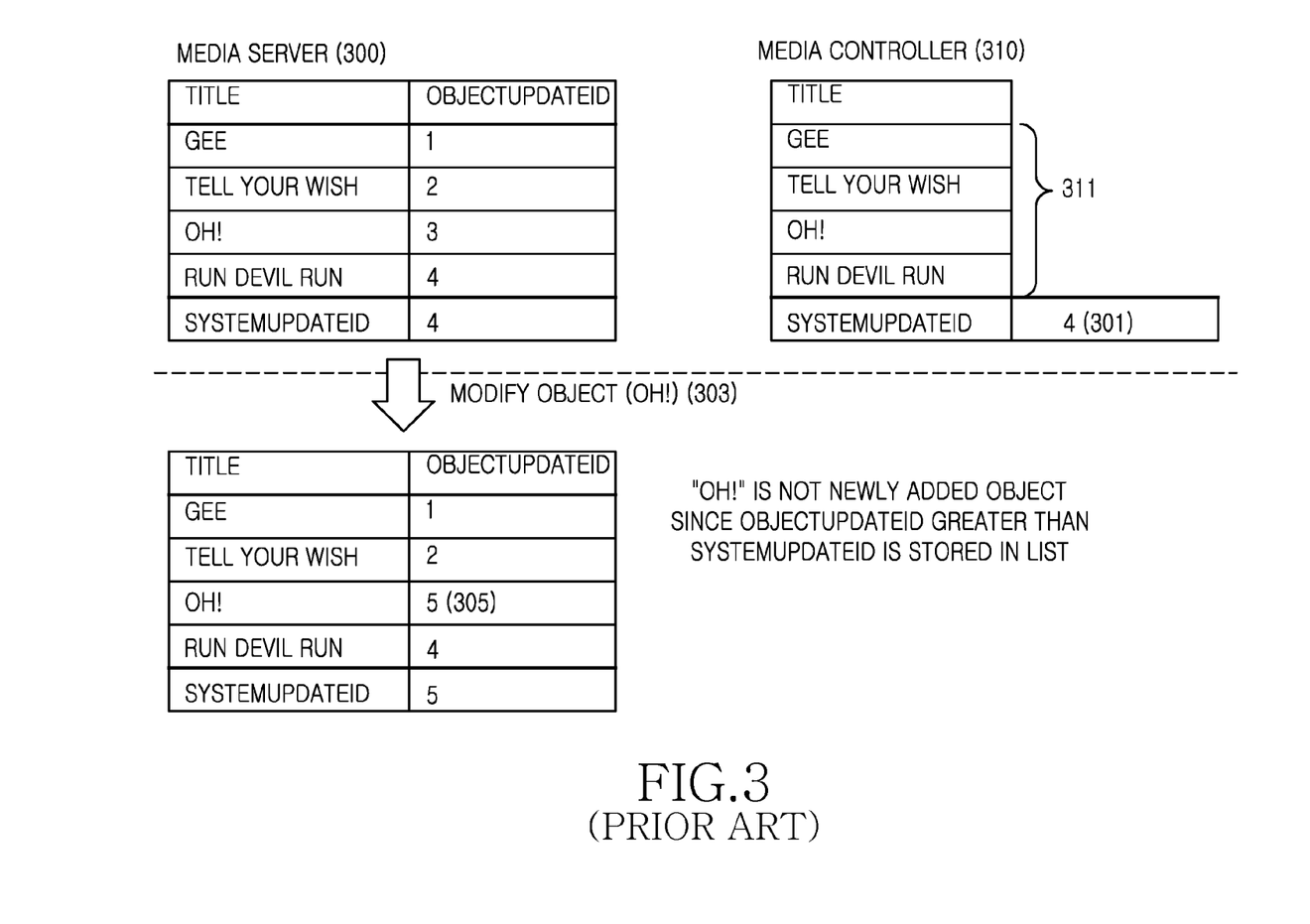
FIG. 3 illustrates a conventional method for determining whether content is added and changed in a CDS.

FIG. 3 illustrates a conventional method for determining whether content is added or changed in a CDS.

Referring to FIG. 3, when a media controller 310 accesses a media server 300, an object list 311 is acquired and stored together with a systemUpdateID 301. Thereafter, when the media controller 310 re-accesses the media server 300, the media controller 310 determines whether an updated object 305 is present in the stored object list 311, in order to determine whether the updated object is an added object or a modified object. However, this method is problematic in that a large storage space is required because the media controller 310 stores an object list for each of the media servers, and in that it has a relatively high processing time, as the updated object 305 and the stored object list 311 have to be compared one by one.

Accordingly, there is a need for an improved method capable of determining whether an updated object is added, modified, or deleted in the UPnP CDS.

SUMMARY OF THE INVENTION

Accordingly, the present invention is designed to solve at least the above-described problems and/or disadvantages and to provide at least the advantages described below.

An aspect of the present invention is to provide a method and apparatus for identifying an object update in a home network.

Another aspect of the present invention is to provide a method and apparatus for identifying an object change in a media server by using a CDS of UPnP.

Another aspect of the present invention is to provide a method and apparatus for mapping an object update identifier (objectUpdateID) and an initial update identifier (initUpdateID) to each object and managing the IDs in a UPnP media server.

Another aspect of the present invention is to provide a method and apparatus for identifying addition, modification, and addition-and-modification of an object update by using an objectUpdateID and an initUpdateID mapped to each object in a UPnP media server.

In accordance with an aspect of the present invention, a method of a media controller for identifying an object update in a home network is provided. The method includes receiving an objectUpdateID and an initUpdateID for an object from an accessed media server, comparing the objectUpdateID and the initUpdateID with a system update identifier (systemUpdateID) previously stored when the media controller accessed the media server, and determining whether the object is updated according to a result of the comparing.

In accordance with another aspect of the present invention, a method of a media server for managing an object in a home network is provided. The method includes setting an objectUpdateID and an initUpdateID for the object, when the object is added, updating the objectUpdateID for the object, when the object is changed, and transmitting the objectUpdateID and the initUpdateID for the object to a media controller accessing the media server.

In accordance with another aspect of the present invention, a media controller apparatus for determining an object update in a home network is provided. The apparatus includes a communication unit for receiving an objectUpdateID and an initUpdateID for an object from an accessed media server, a storage unit for storing a systemUpdateID that is acquired when the media controller accesses the media server, and a controller for comparing the stored systemUpdateID with the objectUpdateID and the initUpdateID, and for determining whether the object is updated according to a result of the comparing.

In accordance with another aspect of the present invention, a media server apparatus for managing an object in a home network is provided. The apparatus includes a controller for setting an objectUpdateID and an initUpdateID for an object, when the object is added, and for updating the objectUpdateID, when the object is changed, a storage unit for storing the objectUpdateID and the initUpdateID for the object, and a communication unit for transmitting the objectUpdateID and the initUpdateID for the object to a media controller accessing the media server.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail herein below with reference to the accompanying drawings. In the following description, well-known functions or constructions are not described in detail to avoid obscuring the description of the invention in unnecessary detail.

A method and apparatus for identifying an object update in a media server using a CDS of UPnP will be described below, wherein one media server is connected to a plurality of media controllers in a home network to provide content information. When a change (update) occurs in an object stored in the media server, addition, modification, and addition-and-modification of the updated object can be determined according to a time at which the media controller accesses to the media server.

Herein, a media server includes a server of a desktop, a Personal Digital Assistant (PDA), a cell phone, a laptop, a camera, or an MPEG-1 Audio Layer 3 (MP3) player, in which the CDS of UPnP AV and a Digital Media Server (DMS) system of Digital Living Network Alliance (DLNA) are implemented. Further, a media controller includes a controller of a desktop, PDA, hand phone, laptop, camera, and MP3 player in which CDS of UPnP Audio/Video (AV) and a media server system of DLNA are implemented.

According to an embodiment of the present invention, a media server sets an object update identifier (objectUpdateID) and an initial update identifier (initUpdateID) for each object and manages the IDs. That is, the media server sets the objectUpdateID and initUpdateID having the same value when an object is added in the media server. Thereafter, when the object is changed, the objectUpdateID can be updated and the initUpdateID can be maintained, thereby indicating that the object is added and then changed. That is, the objectUpdateID is updated when the object is changed, as described in the conventional UPnP CDS:3. The initUpdateID is an ID added according to the present invention, and continuously maintains a value, which is set when the object is added.

Figure 4:
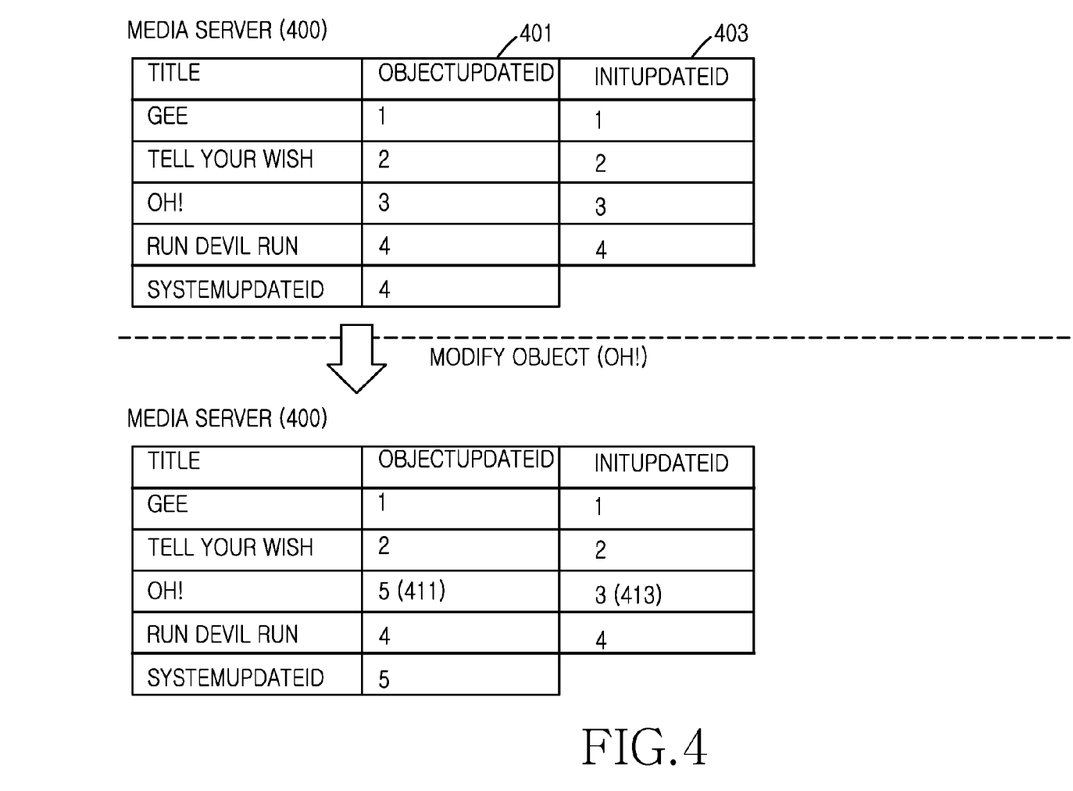
FIG. 4 illustrates a method of modifying an object in a media server according to an embodiment of the present invention.

FIG. 4 illustrates a method of modifying an object in a media server according to an embodiment of the present invention.

Referring to FIG. 4, a media server 400 sets an objectUpdateID 401 and an initUpdateID 403 for each of four objects when the four objects are added. In this case, the objectUpdateID 401 and the initUpdateID 403 are set to the same value. Basically, the objectUpdateID 401 value and the initUpdateID 403 for each new object is set to be greater than the objectUpdateIDs 401 of objects previously stored in the media server 400. Thereafter, when a property of the object "Oh!" is modified in the media server 400, the media server 400 updates the objectUpdateID 401 of the specific object "Oh!" to a value (as indicated by a reference numeral 411), which is greater than the objectUpdateIDs 401 of the other objects, and maintains the initUpdateID 403 at 3.

Therefore, according to an embodiment of the present invention, by setting the objectUpdateID 401 and the initUpdateID 403 for the object and then by changing only the objectUpdateID 401 when an object change occurs, a media controller can determine whether the object is an added object, a modified object, or an added and modified object by using the objectUpdateID, the initUpdateID, and the system update identifier (systemUpdateID).

Figure 5:
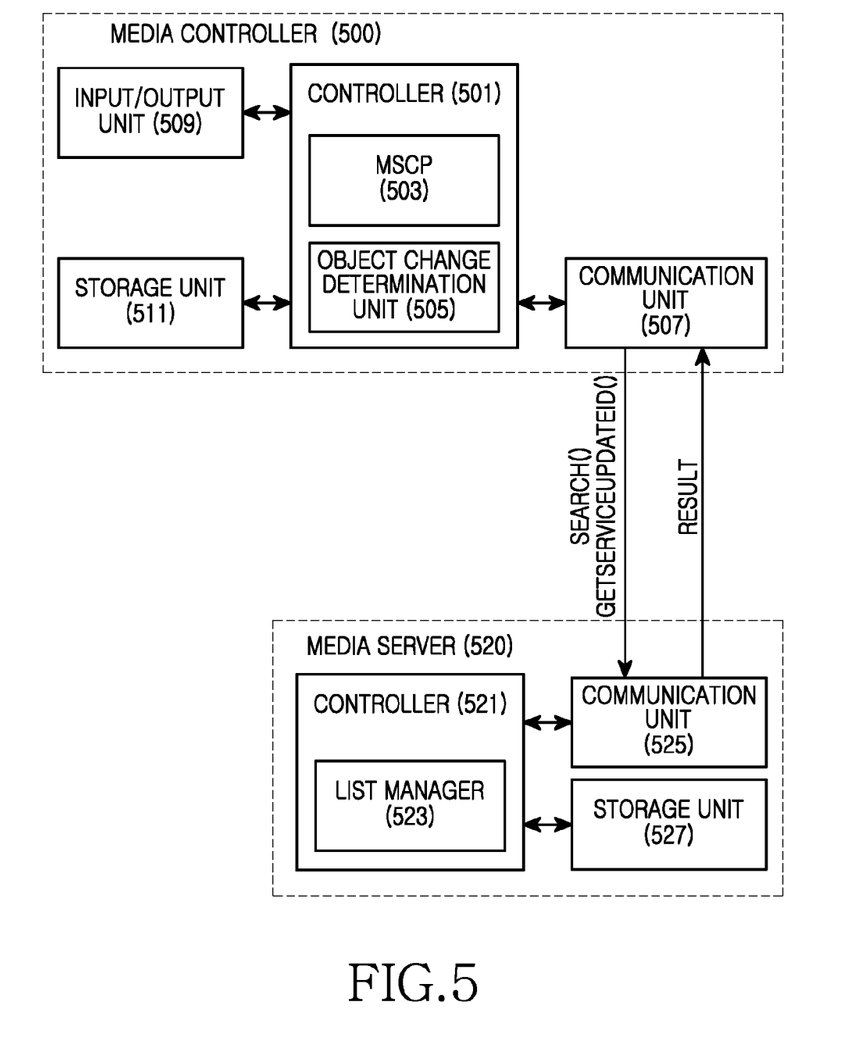
FIG. 5 is a block diagram illustrating a media server and a media controller according to an embodiment of the present invention.

FIG. 5 is a block diagram illustrating a media server and a media controller according to an embodiment of the present invention.

Referring to FIG. 5, a media controller 500 includes a controller 501, a communication unit 507, an input/output unit 509, and a storage unit 511. The controller 501 includes a Media Server Control Protocol (MSCP) 503 and an object change determination unit 505.

In addition, a media server 520 includes a controller 521, a communication unit 525, and a storage unit 527. The controller 521 includes a list manager 523.

In the media server 500, the controller 501 provides overall control to the media controller 500, and controls a function for communicating with the media server 520 by accessing to the media server 520 via the MSCP 503. Specifically, the controller 501 acquires a systemUpdateID from the media server 520 and stores the systemUpdateID in the storage unit 511. Further, the controller 501 determines whether there is an objectUpdateID having a value greater than a systemUpdateID that was previously stored when accessing the media server 520. When there is an objectUpdateID having a value greater than the systemUpdateID, the controller 501 requests and receives information on the objects, i.e., an object ID, an objectUpdateID, and an initUpdateID, from the media server 520. Thereafter, the controller 501 compares the objectUpdateID and initUpdateID received via the object change determination unit 505 with a pre-stored systemUpdateID to determine whether the object is an added object, a modified object, or an added and changed object. The controller 501 can acquire the systemUpdateID from the media server 520 according to an action GetServiceUpdateID( ) defined in the MSCP 503, and can acquire information on objects corresponding to the objectUpdateID having the value greater than the systemUpdateID in the media server 520 according to an action Search( ) or an action Browse( ) defined in the MSCP 503.

When the objectUpdateID of the received object is greater than the pre-stored systemUpdateID and the initUpdateID of the received object is less than or equal to the pre-stored systemUpdateID as expressed in Equation (1) below, the object change determination unit 505 determines that the received object is a modified object.

systemUpdateID<objectUpdateID systemUpdateID≥initUpdateID (1)

When the objectUpdateID of the received object is greater than the pre-stored systemUpdateID, the initUpdateID of the received object is greater than the pre-stored systemUpdateID, and the objectUpdateID is equal to the initUpdateID as expressed in Equation (2) below, the object change determination unit 505 determines that the received object is a newly added object.

systemUpdateID<objectUpdateID systemUpdateID<initUpdateID and objectUpdateID=initUpdateID (2)

When the objectUpdateID of the received object is greater than the pre-stored systemUpdateID, the initUpdateID of the received object is greater than the pre-stored systemUpdateID, and the objectUpdateID is greater than the initUpdateID as expressed in Equation (3) below, the object change determination unit 505 determines that the received object is a newly added and modified object.

systemUpdateID<objectUpdateID systemUpdateID<initUpdateID and objectUpdateID>initUpdateID (3)

Accordingly, under the control of the controller 501, the object change determination unit 505 determines whether the updated object is an added object, a modified object, or an added and modified object, and announces the determination result to a user via the input/output unit 509.

The communication unit 507 controls and processes functions for accessing the media server 520 under the control of the controller 501. Herein, the communication unit 507 accesses to the media server 520 according to conventional, well-known home networking techniques.

The input/output unit 509 includes an input unit (not shown), e.g., a keypad, for receiving data from the user and an output unit (not shown), e.g., an display screen and speaker, for delivering audio, video, and/or text data to the user. The input/output unit 509 outputs information announcing that an object update occurs in the media server 520 which the media controller 500 is accessing.

The storage unit 511 stores data and a variety of programs for operating the media controller 500, and stores the systemUpdateID acquired from the media server 520. Herein, the systemUpdateID is updated to a maximum objectUpdateID stored in the media server 520 whenever the media controller 500 accesses the media server 520.

In the media server 520, the controller 521 provides overall control to the media server 520, and controls functions for communicating with the media server 520 via the communication unit 525. Specifically, when an object is added, the controller 521 sets an objectUpdateID and an initUpdateID for each object using the list manager 523 and stores the IDs in the storage unit 527. Here, the objectUpdateID and the initUpdateID are set to the same value. This value is set to a value greater than the objectUpdateID of objects stored in the storage unit 527.

When a property of the object stored in the storage unit 527 is modified, the media server 520 updates the objectUpdateID of the object and maintains the initUpdateID. In this case, the objectUpdateID of the modified object is set to a value greater than the objectUpdateID of other objects stored in the storage unit 527.

In addition, when information on the updated objects is requested from the media controller 500 via the communication unit 525, the controller 521 searches the objects from the storage unit 527 and thereafter transmits an object ID, an objectUpdateID, and an initUpdateID. Herein, the controller 521 searches for objectUpdateIDs having a value greater than the systemUpdateID previously stored in the media controller 500, searches for information on objects corresponding to the found objectUpdateIDs, and provides the found information to the communication unit 525.

The communication unit 525 controls and processes functions for communicating with the media controller 500 under the control of the controller 521. Herein, the communication unit 525 accesses to the media server 520 according to the conventional, well-known home networking techniques.

The storage unit 527 stores data and a variety of programs for an overall operation of the media server 520, and stores a plurality of objects. In particular, the storage unit 527 stores an objectUpdateID and an initUpdateID for each object under the control of the controller 521. Herein, an object refers to multimedia content, and can be classified into a container and an item.

Figure 6:
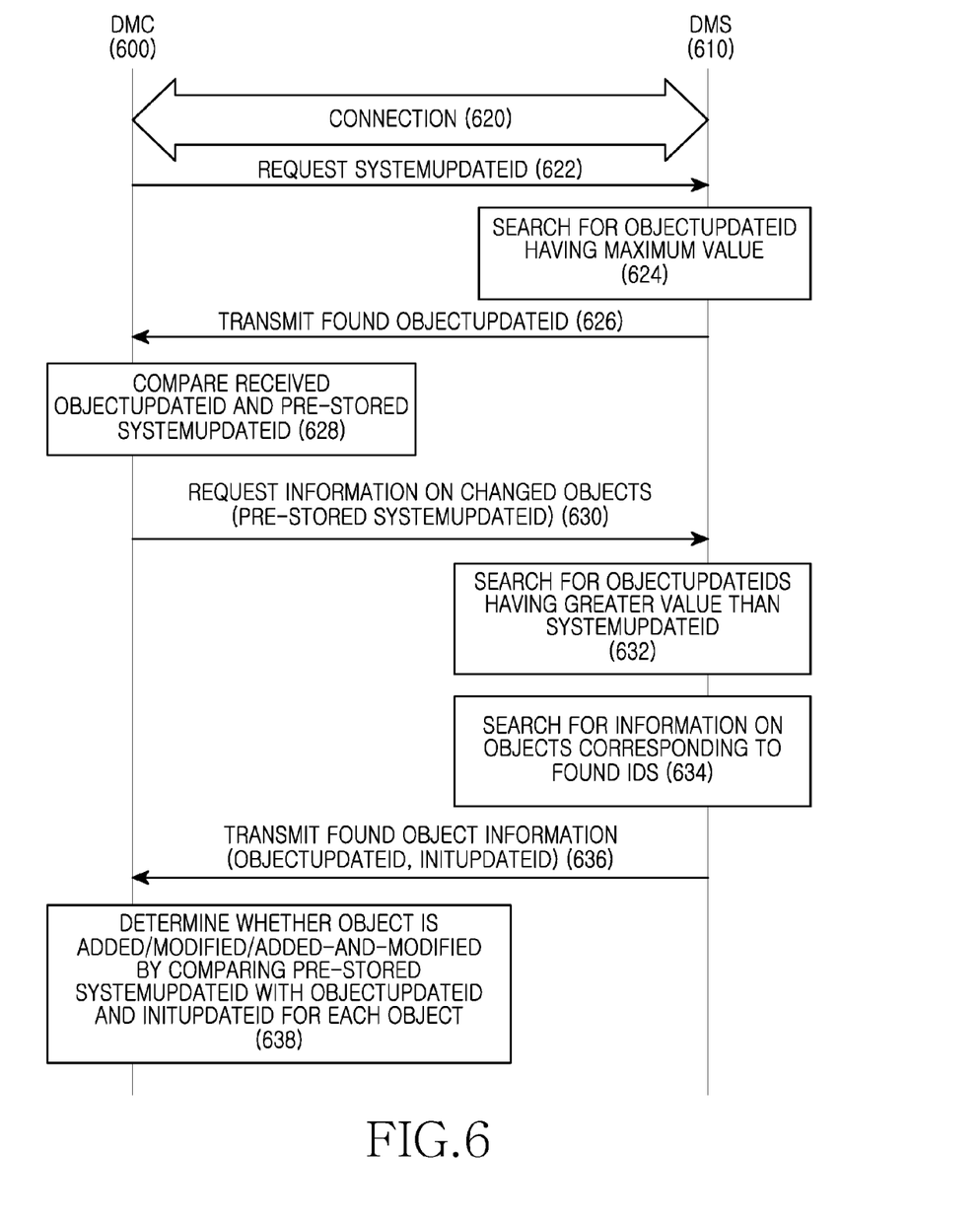
FIG. 6 a signal flow illustrating a method for determining an object update using a CDS according to an embodiment of the present invention.

FIG. 6 a signal flow illustrating a method for determining a change of content in a CDS according to an embodiment of the present invention.

Referring to FIG. 6, a Digital Media Controller (DMC) 600 and a Digital Media Server (DMS) 610 are connected by performing a connection procedure in step 620.

When the DMC 600 requests the DMS 610 to transmit a systemUpdateID in step 622, the DMS 610 searches objectUpdateIDs of objects stored in the DMS 610 to find an objectUpdateID having a maximum value in step 624. In step 626, the DMS 610 transmits the found objectUpdateID to the DMC 600.

In step 628, the DMC 600 compares the received objectUpdateID with a pre-stored systemUpdateID. Herein, if the received objectUpdateID is equal to the pre-stored systemUpdateID, DMC 600 identifies that there is no change in the objects stored in the DMS 610. Thus, it is assumed in the present invention that the received objectUpdateID is greater than the pre-stored systemUpdateID.

However, if the received objectUpdateID has a value greater than the pre-stored systemUpdateID, the DMC 600 requests the DMS 610 to transmit information on the changed objects in step 630. In this case, the DMC 600 can transmit the pre-stored systemUpdateID to the DMS 610 in order to indicate a time at which the DMC 600 previously accessed the DMS 610 and to request transmission of information on the objects that have changed since the previous access time.

In step 632, the DMS 610 searches for objectUpdateIDs having a value greater than the systemUpdateID received from the DMC 600. In step 634, the DMS 610 searches for information on objects corresponding to the found objectUpdateIDs. In step 636, the DMS 610 transmits information on the found objects to the DMC 600. Herein, the information of the objects may include an object ID, an objectUpdateID, an initUpdateID, and other properties.

In step 638, the DMC 600 compares the pre-stored systemUpdateID with the received object information, i.e., the objectUpdateID and the initUpdateID, to determine whether the object is an added object, a modified object, or an added and modified object.

Herein, the DMC 600 can determine an object change by using Equations (1) to (3), as described above.

Figure 7:
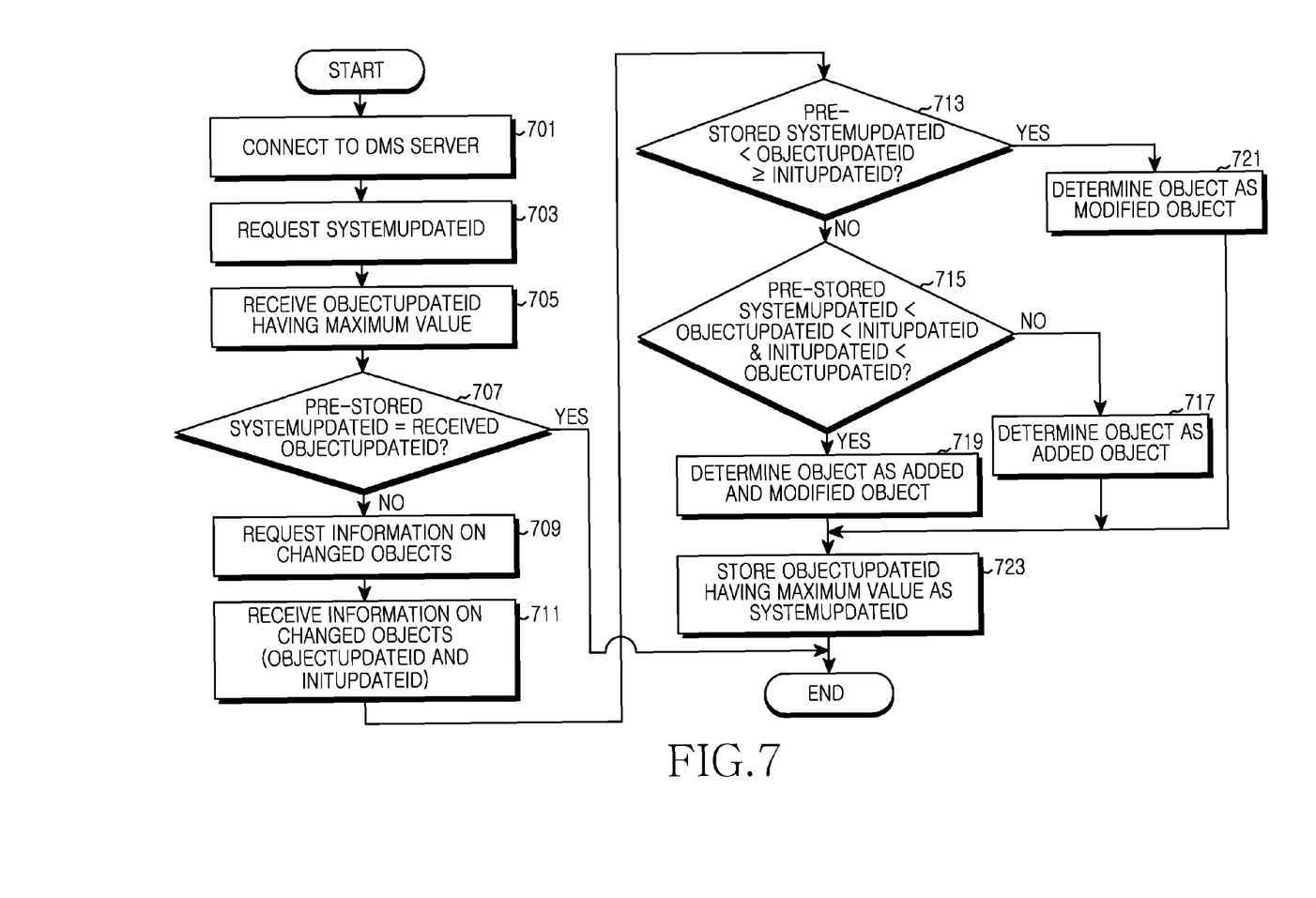
FIG. 7 is a flowchart illustrating a method for determining an object update using a CDS according to an embodiment of the present invention.

FIG. 7 is a flowchart illustrating a method for determining a change of content using a CDS in a DMC according to an embodiment of the present invention.

Referring to FIG. 7, after the DMC is connected to a DMS in step 701, the DMC requests a systemUpdateID to the DMS in step 703.

In step 705, the DMC receives an objectUpdateID having a maximum value among objectUpdateIDs of objects stored in the DMS. In step 707, the DMC determines if the received objectUpdateID is equal to a pre-stored systemUpdateID. If the received objectUpdateID is equal to the pre-stored systemUpdateID, the DMC concludes that there is no change in the objects stored in the DMS and the procedure ends.

However, if the received objectUpdateID has a value greater than the pre-stored systemUpdateID, the DMC requests the DMS to transmit information on the changed objects in step 709. In this case, the DMC transmits the pre-stored systemUpdateID to the DMS in order to announce a time at which the DMC previously accessed the DMS and to request transmission of information on the objects that have changed since the previous access time.

In step 711, the DMC receives information on the changed objects from the DMS. Herein, the information of the objects may include an object ID, an objectUpdateID, an initUpdateID, and other properties.

In step 713, for the objects of which information is received from the DMS, the DMC determines if the objectUpdateID of each object is greater than the pre-stored systemUpdateID and if the initUpdateID of each object is less than or equal to the pre-stored systemUpdateID, as expressed by Equation (1) above. If there is an object among the objects of which information is received from the DMS, which satisfies the conditions of Equation (1), the DMC determines that the object is a modified object in step 721. That is, the DMC may determine that the object existed in the DMS during the previous access and that the object was modified before re-accessing the DMS in step 701.

However, no object satisfies the conditions of Equation (1) in step 713, the DMC determines if the objectUpdateID of an object is greater than the pre-stored systemUpdateID, if the initUpdateID of the object is greater than the pre-stored systemUpdateID, and if the objectUpdateID is greater than the initUpdateID, i.e., the condition of Equation (3). If there is an object that satisfies these conditions of Equation (3) among the objects of which information is received from the DMS, the DMC determines that the object is an added and modified object in step 719. That is, the DMC may determine that the object did not exist in the DMS during the previous access, and that the object was newly added and then modified before re-accessing the DMS in step 701.

However, if no objects satisfy the conditions of Equation (3), the DMC determines that Equation (2) is satisfied. Thereafter, the DMC determines that the object is an added object in step 717. That is, the DMC determines that the object did not exist in the DMS during the previous access, and the object was newly added before re-accessing the DMS in step 701.

In step 723, if the access to the DMS is complete, the DMC stores an objectUpdateID having a maximum value among objectUpdateIDs received from the DMS as a systemUpdateID.

Figure 8:
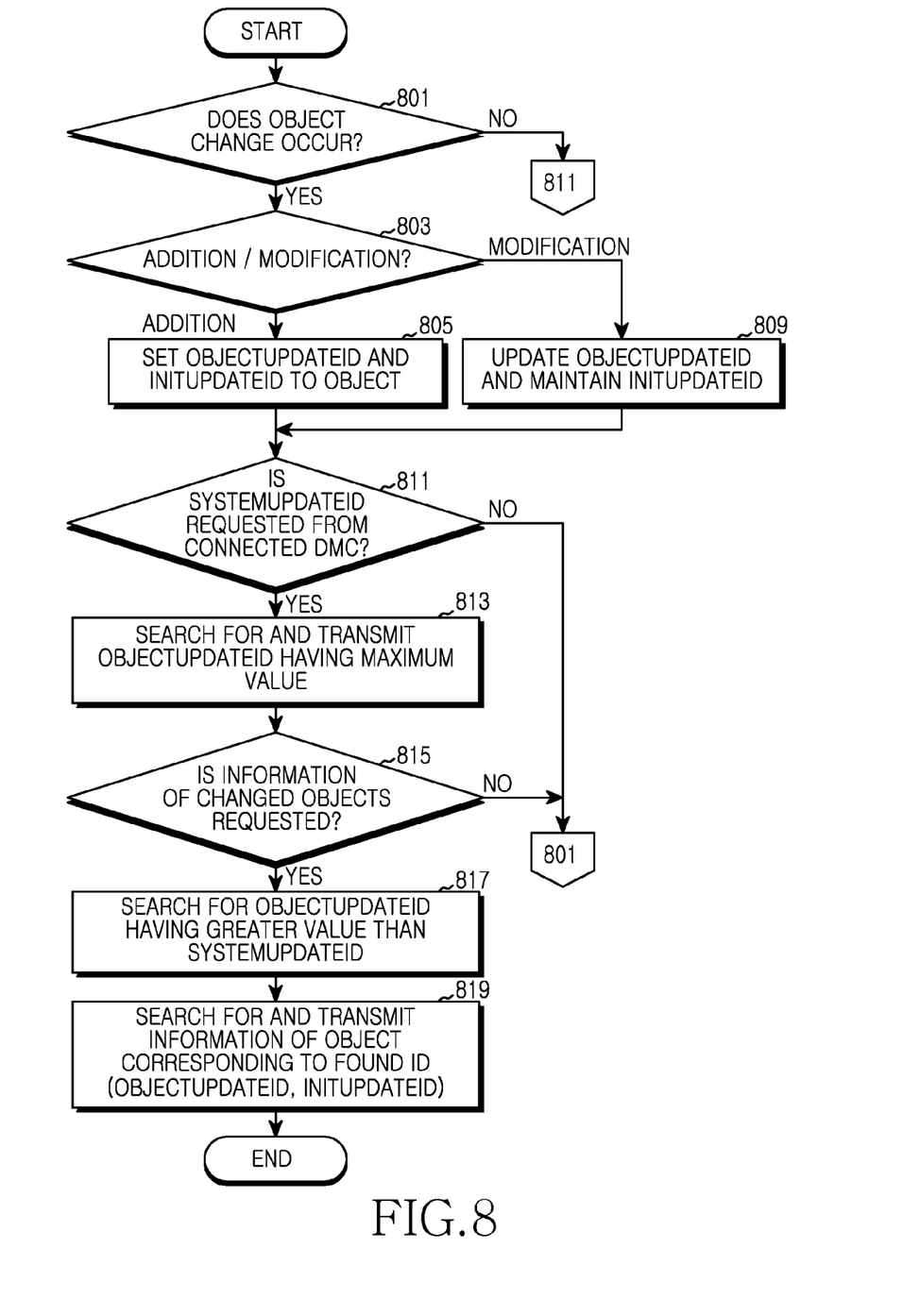
FIG. 8 is a flowchart illustrating a method for determining an object update using a CDS according to an embodiment of the present invention.

FIG. 8 is a flowchart illustrating a method for determining a change of content using a CDS in a DMC according to an embodiment of the present invention.

Referring to FIG. 8, the DMS determines if an object change (update) occurs in step 801. If the object change does not occur, the procedure proceeds to step 811. However, if the object change occurs, the DMS determines whether the change type is an object addition or an object modification.

If the object change corresponds to the object addition, the DMS sets an objectUpdateID and an initUpdateID to the added object, in step 805. In this case, the objectUpdateID and the initUpdateID are set to the same value. This value is greater than the objectUpdateID of objects stored in the DMS.

However, if the object change corresponds to the object modification, the DMS updates the object update ID of the modified object, and maintains the initUpdateID in step 809.

The objectUpdateID of the modified object is updated to a value greater than the objectUpdateID of other objects stored in the DMS.

In step 811, the DMS determines if a systemUpdateID is requested from a DMC connected to the DMS. If the systemUpdateID is not requested from the DMC, the procedure returns to step 801, and the DMS repeats the subsequent steps. However, if the systemUpdateID is requested from the DMC, in step 813, the DMS searches objectUpdateIDs of objects stored in the DMS to find an objectUpdateID having a maximum value and then transmits the found objectUpdateID to the DMC.

In step 815, the DMS determines if information of the changed objects is requested from the DMC. If the information of the changed objects is not requested from the DMC, the procedure returns to step 801, and the DMS repeats the subsequent steps. However, if the information of the changed objects is requested from the DMC, in step 817, the DMS acquires a systemUpdateID that indicates a previous access time of the DMC, and then searches the objects stored in the DMS to find objectUpdateIDs that are greater than the acquired systemUpdateID.

In step 819, the DMS transmits information of objects corresponding to the found objectUpdateIDs to the DMC. Herein, the information of objects may include an object ID, an objectUpdateID, an initUpdateID, and other properties.

Figure 9:
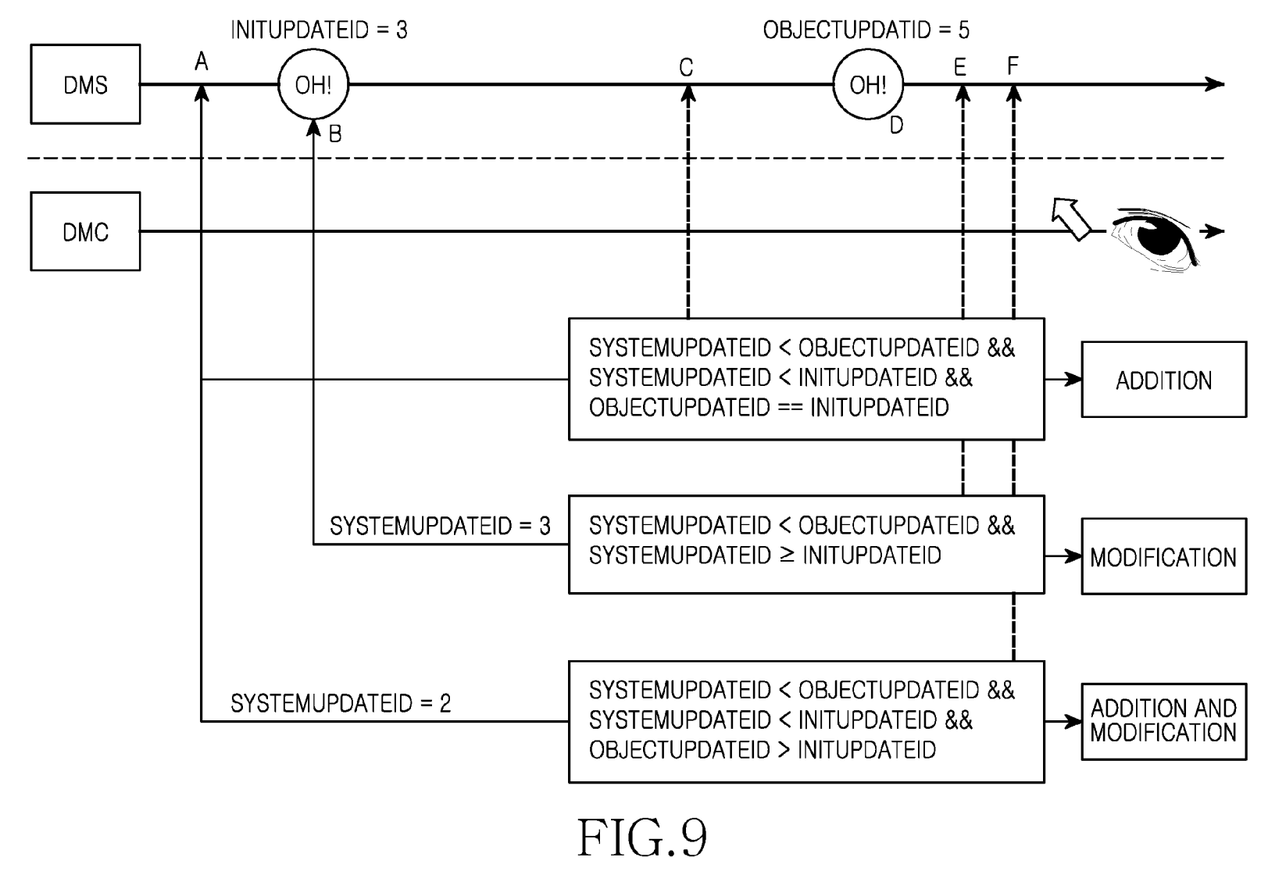
FIG. 9 illustrates a result of determining a change of content using a time at which a DMC accesses a DMS using a CDS according to an embodiment of the present invention.

FIG. 9 illustrates a result of determining a change of content using a time at which a DMC accesses a DMS using a CDS according to an embodiment of the present invention. Specifically, in FIG. 9, an object change is determined according to an access time of a DMC, and the object is added and modified in a DMS.

Referring to FIG. 9, in the DMS, an object "Oh!" is added at a time B, and thus, an objectUpdateID and an initUpdateID are set to 3. Further, the object "Oh!" is modified at a time D, and thus, the objectUpdateID is changed to 5 and the initUpdateID is maintained as 3. Using this time line, three different examples are described below.

Example 1

When the DMC accesses the DMS at time A, it acquires and stores a systemUpdateID, which is set to 2. The DMC then terminates its access to the DMS.

Thereafter, when the DMC re-accesses the DMS at time C, because the objectUpdateID and the initUpdateID of the object "Oh!" are now 3, which is greater than the previously stored systemUpdateID (i.e., 2), the DMC identifies that the object "Oh!" is an object that was newly added after time A.

Example 2

When the DMC accesses the DMS at time B, it acquires and stores a systemUpdateID, which is set to 3. The DMC then terminates its access to the DMS.

Thereafter, when the DMC re-accesses to the DMS at time E, because the objectUpdateID of the object "Oh!" is now 5, which is greater than the previously stored systemUpdateID (i.e., 3) and the initUpdateID and the objectUpdateID are still equally 3, the DMC identifies that the object "Oh!" is an object that was modified after time B.

Example 3

When the DMC accesses the DMS at time A, it acquires and stores a systemUpdateID, which is set to 2. The DMC then terminates its access to the DMS.

Thereafter, when the DMC re-accesses to the DMS at time F, because the objectUpdateID and the initUpdateID of the object "Oh!" are 5 and 3, respectively, each of which being greater than the previously stored systemUpdateID (i.e., 2) and the objectUpdateID being greater than the initUpdateID, the DMC identifies that the object "Oh!" is an object that was added and then modified after time A.

Figure 10:
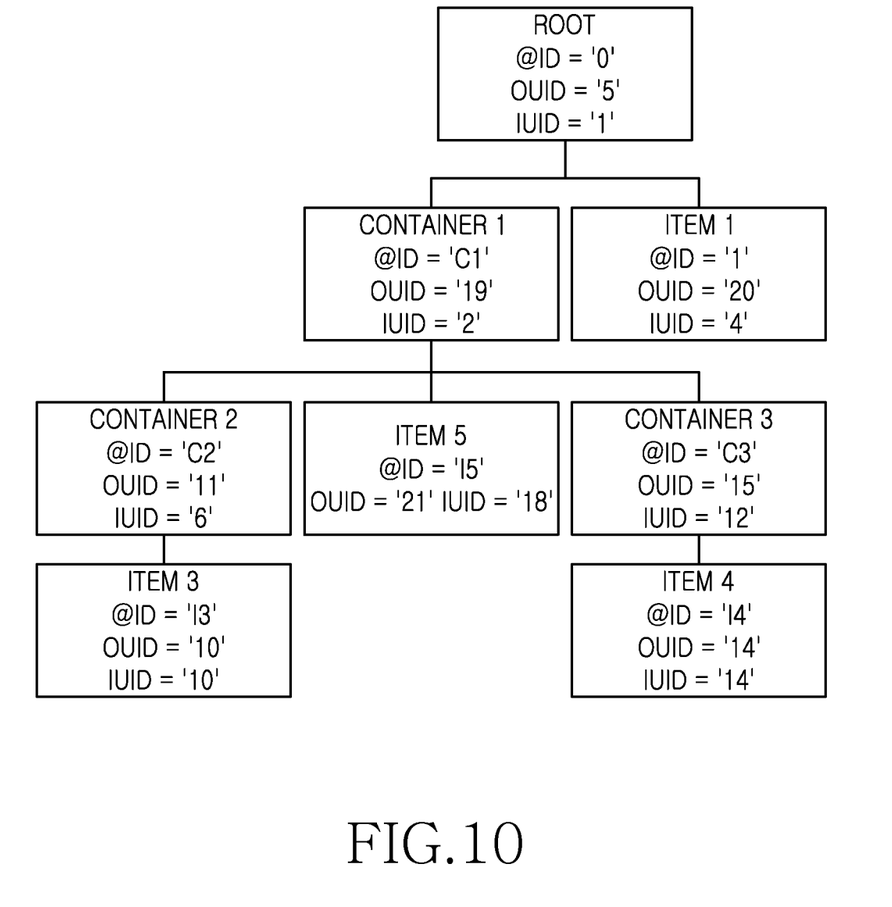
FIG. 10 illustrates content in a CDS according to embodiment of the present invention.

FIG. 10 illustrates a structure of content in a CDS according to an embodiment of the present invention.

Referring to FIG. 10, the structure of the content includes the following steps for generating and modifying each object. Herein, @id denotes an object ID, ouid denotes an objectUpdateID, and iuid denotes an initUpdateID.

Step 1: generate root (@id='0' ouid='1' iuid='2')
Step 2: generate container 1 as child of root (@id='c1' ouid='2' iuid='2')
Step 3: generate item 1 as child of root (@id='i1' ouid='4' iuid='4')
Step 4: generate container 2 as child of container 1 (@id='c2' ouid='6' iuid='6')
Step 5: generate item 2 child of container 1 (@id='i2' ouid='8' iuid='8')
Step 6: generate item 3 as child of container 2 (@id='i3' ouid='10' iuid='10')
Step 7: generate container 3 as child of container 1 (@id='c3' ouid='12' iuid='12')
Step 8: generate item 4 as child of container 3 (@id='i4' ouid='14' iuid='14')
Step 9: delete item 2 (@id='i2' ouid='16' iuid='16')
Step 10: generate item 5 as child of container 1 (@id='i5' ouid='18' iuid='18')
Step 11: change item 1(@id='i1' ouid='20' iuid='4')
Step 12: change item 5 (@id='i5' ouid='21' iuid='18')

When each object is generated and modified through the aforementioned steps, the systemUpdateID becomes 21 at the last step.

If it is assumed that, when step 6 is complete, a DMC accesses a DMS and the access is complete before step 7 is performed, then the systemUpdateID becomes 11 at that time because an objectUpdateID of the container 2, which is a parent object of the item 3, is changed when the item 3 is generated. Thereafter, if the DMC accesses the DMS after step 12 is completed, a newly added object, a modified object, and an added and modified object can be identified using a systemUpdateID (i.e., 11) stored in the previous access. In this case, the DMC can identify that item 5, the container 3, and the item 4 are newly added objects, the container 1 and the item 1 are modified objects, and among the newly added objects, the item 5 and the container 3 are added and modified objects. Herein, the container 1 is a case where an object change occurs when its child object (i.e., item 2) is deleted and the item 3 is generated.

As described above, the present invention can also be equally applied when respective objects of the DMS have a parent-child relationship.

Although the embodiments of the present invention described above have been described using an objectUpdateID and an initUpdateID to detect an object change, information on a date and/or time when the object is changed and information on a date and/or time when the object is generated may be used instead of the objectUpdateID and the initUpdateID. However, the date and/or time information is usually configured in a unit of year/month/date/hour/millisecond, and thus it is more complex than the ID. Further, because different time zones are used, there is a disadvantage in that additional processing is required to consider the different time zones.

In addition, because the change of objects may occur in a unit of milliseconds, when using the date information, there is a problem in that the same date and/or time information can be set in a plurality of objects. Therefore, although object generation date and/or time and object change data information can be used to determine the change of objects in accordance with an embodiment of the present invention, it is more effective to use an ID for indicating a sequence in which the object is generated and an ID for indicating a sequence in which the object is changed.

According to the above-described embodiments of the present invention, an objectUpdateID and an initUpdateID are mapped and managed for each object in a media server of UPnP. Therefore, a media controller for performing new content display for tracking for an object change, content synchronization, Electronic Program Guides (EPG) etc., can determine whether an object is an added object, a changed object, or an added and changed object by using the objectUpdateID and initUpdateID mapped to each object. Because the media controller stores the systemUpdateID, without having to store information on objects stored in the server, there is an advantage in that storage space can be saved and resources required for a comparison operation can be saved. In addition, because the added object and the changed object can be separated, resources can be effectively used.

While the present invention has been particularly shown and described with reference to certain embodiments thereof, it will be understood by those skilled in the art that various changes in form and details may be made therein without departing from the spirit and scope of the present invention as defined by the appended claims and any equivalents thereof.

What is claimed is:

1. A method for determining an object update by a media controller in a home network, the method comprising:
    receiving and storing a system update identifier (systemUpdateID), when accessing a media server;
    receiving an object update identifier (objectUpdateID) and an initial update identifier (initUpdateID) for an object, when re-accessing the media server;
    comparing the received objectUpdateID and initUpdateID with the systemUpdateID; and
    determining whether the object is updated according to a result of the comparing.

2. The method of claim 1, wherein the objectUpdateID indicates a sequence in which the object is updated in the media server, and the initUpdateID indicates a sequence in which the object is added in the media server.

3. The method of claim 1, wherein determining whether the object is updated comprises:
    determining the object as being modified, when the objectUpdateID of the object is greater than the systemUpdateID, and the initUpdateID of the object is less than or equal to the systemUpdateID; and
    determining the object as being added, when the objectUpdateID of the object is greater than the systemUpdateID, the initUpdateID of the object is greater than the systemUpdateID, and the objectUpdateID of the object is equal to the initUpdateID.

4. The method of claim 3, wherein determining whether the object is updated further comprises:
    determining the object as being added and modified, when the objectUpdateID of the object is greater than the systemUpdateID, the initUpdateID of the object is greater than the systemUpdateID, and the objectUpdateID of the object is greater than the initUpdateID.

5. The method of claim 1, further comprising:
    requesting the media server to transmit information on at least one object of which an objectUpdateID is greater than the systemUpdateID, when accessing the media server; and
    storing an objectUpdateID having a maximum value among objectUpdateIDs received from the media server as the systemUpdateID.

6. A method for managing an object by a media server in a home network, the method comprising:
    setting an object update identifier (objectUpdateID) and an initial update identifier (initUpdateID) for an object, when the object is added;
    updating the objectUpdateID for the object, when the object is updated; and
    transmitting the objectUpdateID and the initUpdateID for the object to a media controller accessing the media server.

7. The method of claim 6, wherein the objectUpdateID and the initUpdateID for the object are set to a same value, when the object is added.

8. The method of claim 6, wherein the initUpdateID of the object is maintained when the object is updated.

9. The method of claim 6, wherein the objectUpdateID is updated to a value greater than objectUpdateIDs of all other objects stored in the media server.

10. The method of claim 6, further comprising:
    receiving, from the media controller, a system update identifier (systemUpdateID) that was acquired by the media controller when the media controller previously accessed the media server; and
    searching for information on an object of which an objectUpdateID is greater than the systemUpdateID received from the media controller.

11. A media controller apparatus for determining an object update in a home network, the apparatus comprising:
    a storage unit configured to store a system update identifier (systemUpdateID) when the media controller accesses a media server;
    a communication unit configured to receive an object update identifier (objectUpdateID) and an initial update identifier (initUpdateID) for an object, when the media controller re-accesses the media server; and
    a controller configured to compare the systemUpdateID with the objectUpdateID and the initUpdateID, and for determining whether the object is updated according to a result of the comparing.

12. The apparatus of claim 11, wherein the objectUpdateID indicates a sequence in which the object is updated in the media server, and the initUpdateID indicates a sequence in which the object is added in the media server.

13. The apparatus of claim 11, wherein the controller determines the object as being modified, when the objectUpdateID of the object is greater than the systemUpdateID, and the initUpdateID of the object is less than or equal to the systemUpdateID, and determines the object as being added, when the objectUpdateID of the object is greater than the systemUpdateID, the initUpdateID of the object is greater than the systemUpdateID, and the objectUpdateID of the object is equal to the initUpdateID.

14. The apparatus of claim 13, wherein the controller determines the object as being added and modified, when the objectUpdateID of the object is greater than the systemUpdateID, the initUpdateID of the object is greater than the systemUpdateID, and the objectUpdateID of the object is greater than the initUpdateID.

15. The apparatus of claim 11, wherein the communication unit requests the media server to transmit information on an object of which an objectUpdateID is greater than the systemUpdateID, when the media controller re-accesses the media server, and the storage unit stores an objectUpdateID having a maximum value among objectUpdateIDs received from the media server as the systemUpdateID.

16. A media server apparatus for managing an object in a home network, the apparatus comprising:
- a controller configured to set an object update identifier (objectUpdateID) and an initial update identifier (initUpdateID) for an object when the object is added, and for updating the objectUpdateID, when the object is updated;
- a storage unit configured to store the objectUpdateID and the initUpdateID for the object; and
- a communication unit configured to transmit the objectUpdateID and the initUpdateID for the object to a media controller accessing the media server.

17. The apparatus of claim 16, wherein the controller sets the objectUpdateID and the initUpdateID for the object to a same value, when the object is added.

18. The apparatus of claim 16, wherein the controller maintains the initUpdateID of the object, when the object is updated.

19. The apparatus of claim 16, wherein the controller updates the objectUpdateID to a value greater than objectUpdateIDs of all other objects stored in the media server.

20. The apparatus of claim 16, wherein the communication unit receives, from the media controller, system update identifier (systemUpdateID) that was acquired when the media controller previously accessed the media server, and the controller searches for information on an object of which an objectUpdateID is greater than the systemUpdateID received from the media controller.

* * * * *